(12) United States Patent
Lee

(10) Patent No.: US 6,352,272 B1
(45) Date of Patent: Mar. 5, 2002

(54) SUSPENSION SYSTEM FOR A VEHICLE

(75) Inventor: Un-Koo Lee, Kyungki-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/439,527

(22) Filed: Nov. 12, 1999

(30) Foreign Application Priority Data

Nov. 12, 1998 (KR) .............................. 98-48361
Jul. 21, 1999 (KR) .............................. 99-29550

(51) Int. Cl.[7] .............................................. B60G 3/04
(52) U.S. Cl. ......................... 280/124.134; 280/124.125
(58) Field of Search ................. 280/124.134, 124.135, 280/124.1, 86.751, 86.753, 86.754, 86.756, 124.117, 124.121, 124.125, 124.127, 5.521, 5.522, 5.523

(56) References Cited

U.S. PATENT DOCUMENTS 2,096,969 A * 10/1937 Lemay ................ 280/124.134
5,374,075 A * 12/1994 Lee ........................ 280/86.754
5,560,637 A * 10/1996 Lee ........................... 280/5.521
6,113,120 A * 9/2000 Heap ................... 280/124.135

FOREIGN PATENT DOCUMENTS

DE 3520778 * 1/1986 ........ 280/FOR 125
JP 402249713 * 10/1990 ........ 280/FOR 124
JP 404159112 * 6/1992 ........ 280/FOR 124

* cited by examiner

Primary Examiner—Daniel G. DePumpo
Assistant Examiner—David R. Dunn
(74) Attorney, Agent, or Firm—Christie, Parker & Hale, LLP

(57) ABSTRACT

A suspension system for a vehicle includes an axle shaft for rotatably supporting a wheel; a strut assembly for vertically supporting the axle shaft on a vehicle body; and a cam assembly for coupling a vehicle body side end of the axle shaft to the vehicle body such that the vehicle body side end contacts the vehicle body with a contacting curvature identical to an instantaneous center line of the wheel. The cam assembly includes a cam disposed between the vehicle body and the vehicle body side end of the axle shaft, the cam having a cam-surface curved toward the wheel, a curvature of cam surface being identical to the instantaneous center line of the wheel, and wherein the vehicle body side end of the axle shaft is designed to tightly contact the cam surface.

24 Claims, 7 Drawing Sheets

SUSPENSION SYSTEM FOR A VEHICLE

BACKGROUND OF THE INVENTION (a) Field of the Invention

The present invention relates to a suspension system for a vehicle.

(b) Description of the Related Art

Generally, a suspension system for a vehicle connects an axle to a vehicle body, and absorbs vibrations and impacts from a road surface while the vehicle is being driven to enhance safety and ride comfort.

To absorb impacts, the suspension system is connected flexibly in a vertical direction, and to withstand driving, braking and centrifugal forces transmitted from wheels. The suspension system is connected firmly in a horizontal direction.

The conventional suspension system is comprised of a plurality of links and joints, making an assembly process complicated and increasing manufacturing costs.

SUMMARY OF THE INVENTION

Therefore, there is a need for a suspension system which is designed having a small number of parts to reduce manufacturing costs, while providing improved performance.

To meet the above need, the present invention provides a suspension system for a vehicle, comprising an axle shaft for rotatably supporting a wheel; a strut assembly for vertically supporting the axle shaft on a vehicle body; and a cam assembly for coupling a vehicle body side end of the axle shaft to the vehicle body such that the vehicle body side end contacts the vehicle body with a contacting curvature identical to an instantaneous center line of the wheel.

The cam assembly comprises a cam disposed between the vehicle body and the vehicle body side end of the axle shaft, the cam having a cam-surface curved toward the wheel, a curvature of cam surface being identical to the instantaneous center line of the wheel, and wherein the vehicle body side end of the axle shaft is designed to tightly contact the cam surface.

The cam assembly may further comprise a cam contacting member disposed between the cam and the vehicle body, the cam contacting member having a cam contacting surface, a curvature of which is larger than that of the cam surface.

Preferably, an insulating member may be disposed between the cam contacting member and the vehicle body, and the axle shaft may be biased toward the vehicle body by a tension spring.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figure 1:
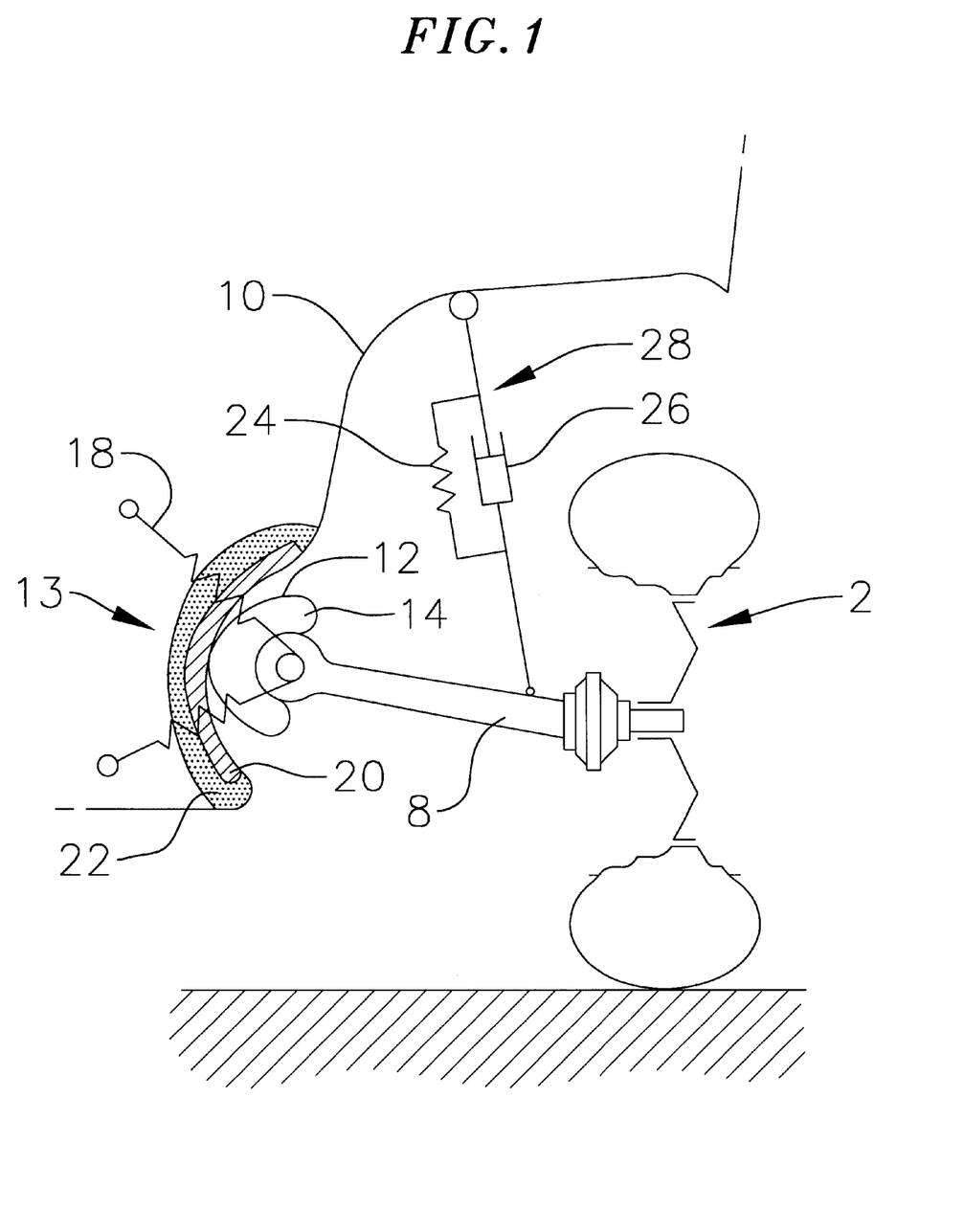
FIG. 1 is a schematic diagram of a suspension system according to a first embodiment of the present invention.

FIG. 1 shows a suspension system according to a first embodiment of the present invention.

A suspension system comprises an axle shaft 8 for supporting a wheel 2, and a cam assembly 13 disposed between the axle shaft 8 and a vehicle body 1. The cam assembly 13 comprises a cam 14 having a cam-surface, a curvature of which is identical to a trace drawn along instantaneous centers of the wheel 2 when the wheel 2 bounces and rebounds. When a wheel bounces in a suspension system of a vehicle, the trajectory of the wheel moves along a curved line. The curvature of the curved line is such that at any given point along the curved line, the radius of curvature may be different. Each point along the curved line is referred to for convenience as "instantaneous center of the wheel" and the curved line is referred to for convenience as the "curved instantaneous center line".

Describing more in detail, an inner end of the axle shaft 8 is rounded such that that it complementary surface-contacts the cam surface of the cam 14. The inner end of the axle shaft 8 is connected to the vehicle body 10 by a tension spring 18. The vehicle body 10 is provided at a portion contacting the cam 14 with an arc-shaped contacting member 20. An insulating member 22 is provided between the vehicle body 10 and the contacting member 20.

Since the axle shaft 8 is connected to the vehicle body 10 by the tension spring 18, the axle shaft 8 can actively operate with respect to the movement of the cam 14 while being biased by the tension spring 18. The insulating member 22 prevents impact from directly transmitting to the vehicle body 10 through the cam 14.

In addition, a strut assembly 28 having a shock absorber 26 and a spring 24 is vertically disposed between the axle shaft 8 and the vehicle body 10. The strut assembly 28 absorbs impact which is vertically transmitted to the vehicle body 10 from the wheel 2.

The operation of the above-described suspension system will be described hereinafter with reference to FIGS. 2 and 3

Figure 2:
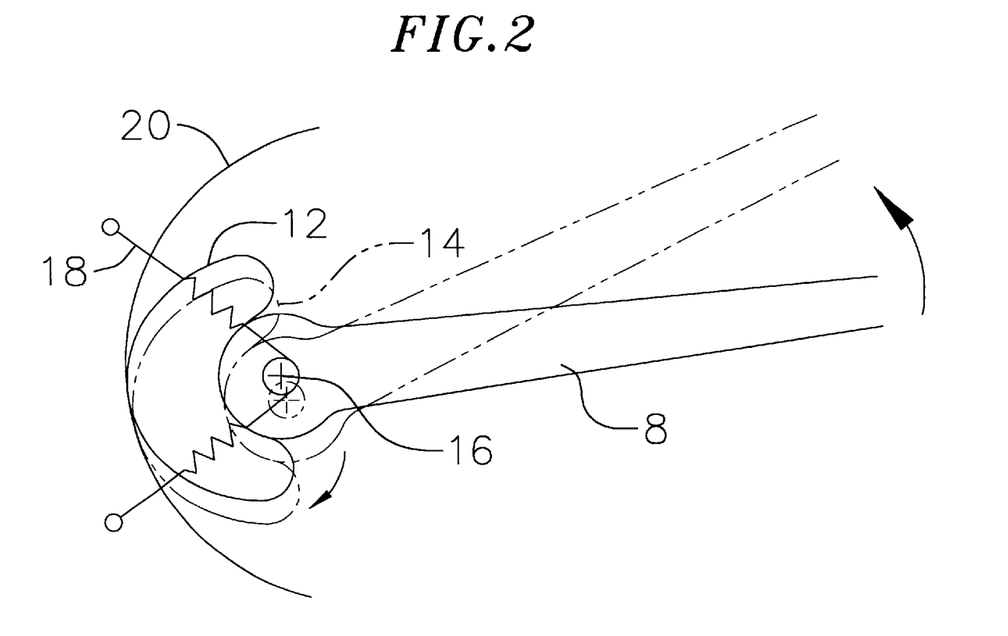
FIGS. 2 and 3 are schematic views illustrating the operation of the suspension system depicted in FIG. 1.

When the wheel 2 bounces, as shown in FIG. 2, the axle shaft 8 rotates counterclockwise in the drawing as the wheel ascends as shown by the broken line.

At this point, the axle shaft 8 is biased toward the vehicle body 10 by the tension spring 18, thereby receiving a load in a longitudinal direction thereof. As a result, the cam 14 rotates clockwise as shown by the broken line. At this point, due to the curvature of the cam surface 12, the cam 14 is declined downward. The declination of the cam 14 allows the axle shaft 8 surface-contacting the cam surface 12 to move inner-downward.

That is, the axle shaft 8 moves along the cam surface 12 of the cam 14 by the clockwise rotation the cam 14.

Figure 3:
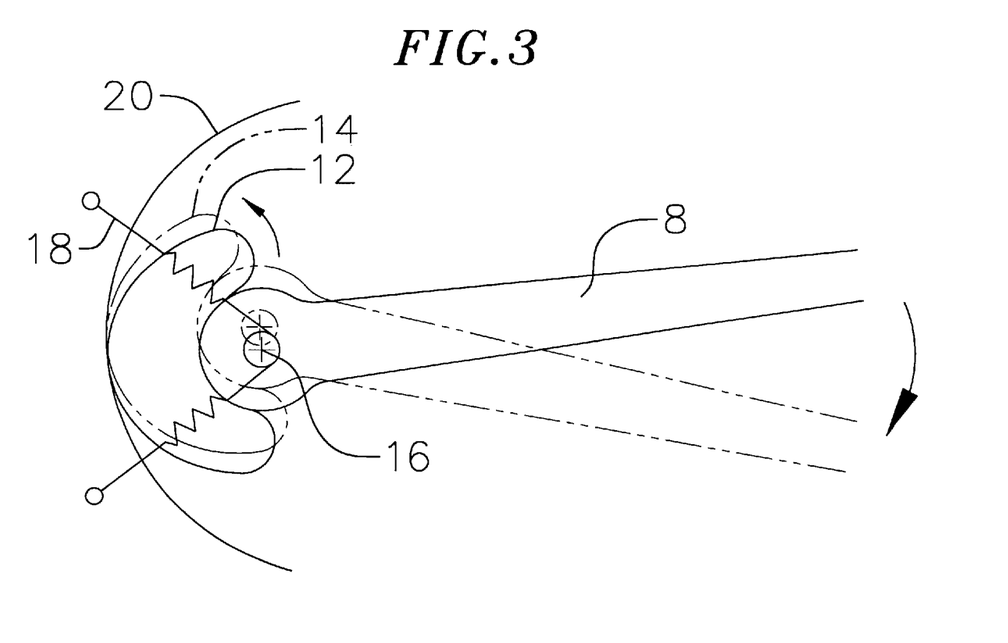

When the wheel 2 rebounds, as shown in FIG. 3, the axle shaft 8 rotates clockwise as shown by broken line. At this point, the axle shaft 8 is biased toward the vehicle body 10 by the tension spring 18, thereby receiving a load in a longitudinal direction thereof. As a result, the cam 14 rotates counterclockwise as shown by the broken line. At this point, due to the curvature of the cam surface 12, the cam 14 is declined upward. The declination of the cam 14 allows the axle shaft 8 surface-contacting the cam surface 12 to move inner-upward.

That is, the axle shaft 8 does not move along the trace of the instantaneous center of the wheel 2 but along the cam surface 12 of the cam 14 by the counterclockwise rotation the cam 14.

In the above described suspension system, since a plurality of links and joints are not used, manufacturing costs are kept as a minimum. In addition, by properly adjusting the curvature of the cam 14, the instantaneous center of the wheel 2 can be accurately adjusted.

Figure 4:
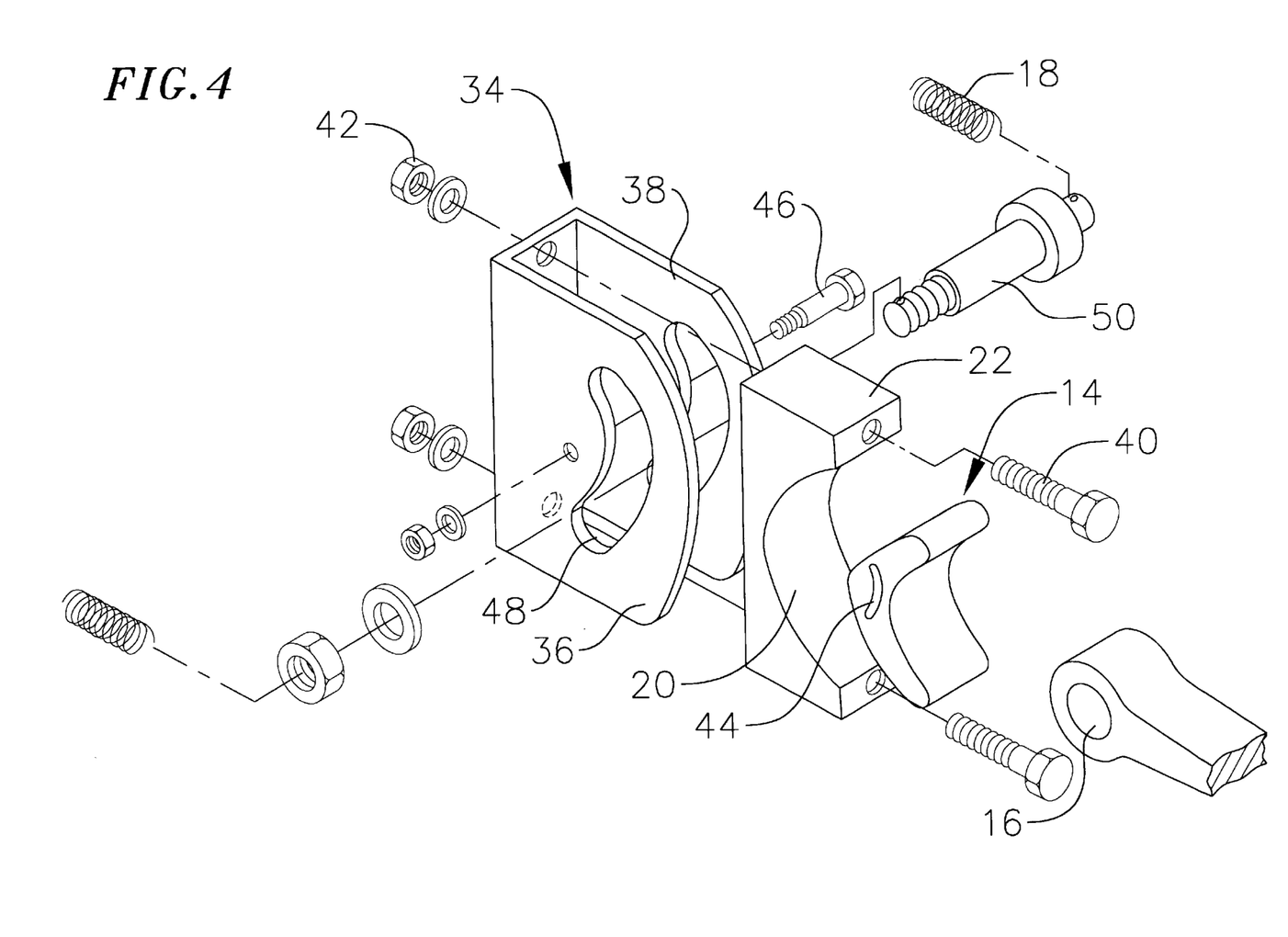
FIG. 4 is an exploded perspective view of a cam assembly of a second exemplary embodiment suspension system of the present invention.
Figure 5:
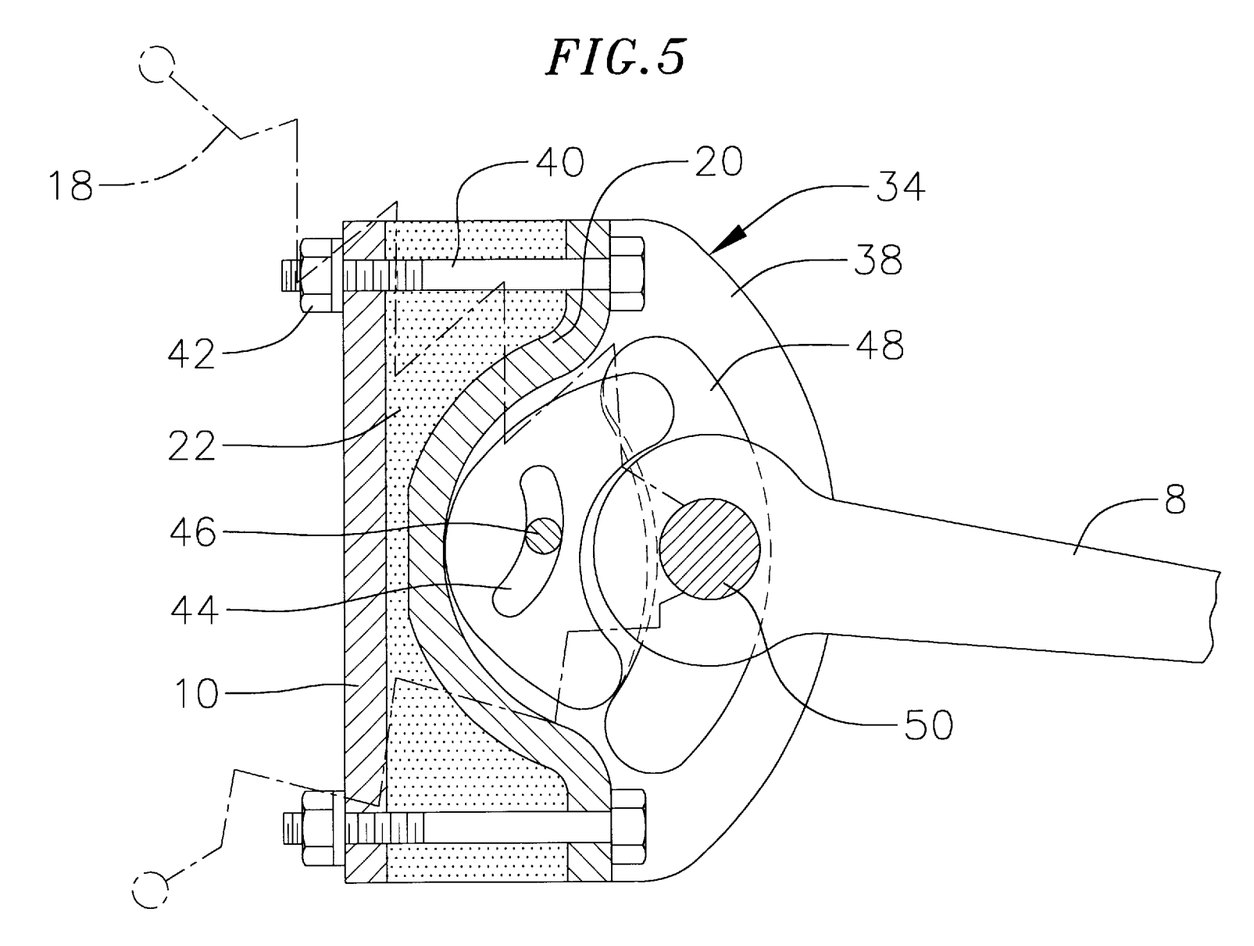
FIG. 5 is a partial sectional view of a cam assembly depicted in FIG. 4.

FIGS. 4 and 5 show detailed views of a cam assembly 13 of a second exemplary embodiment suspension system.

The cam assembly 13 comprises a bracket 34 for mounting on the vehicle body 10. The insulating member 22 and the cam-contacting member 20 are inserted inside the bracket 34. Upper and lower ends of the insulating member 22 are fixed on the bracket 34 by bolts 40 and nuts 42. The cam 14 is disposed contacting the cam contacting member 20. The cam 14 is provided with a cam guide slot 44 having a curvature in a direction opposite to that of the cam surface 12. The cam 14 is fixed on the bracket 34 by a guide pin 46 penetrating the cam guide slot 44 and holes formed in side plates 36 and 38 of the bracket 34. The cam guide slot 44 allows the cam 14 to smoothly rotate when the wheel ascends and descends.

Axle shaft guide slots 48 having a curvature similar in direction and overall shape as the guide slot 44 are formed in the side plates 36 and 38 of the bracket 34. Assembled through the guide slots 48 and an inner end center hole 16 of the axle shaft 8 is a guide pin 50 to which one end of the tension spring 18 is fixed.

Figure 6:
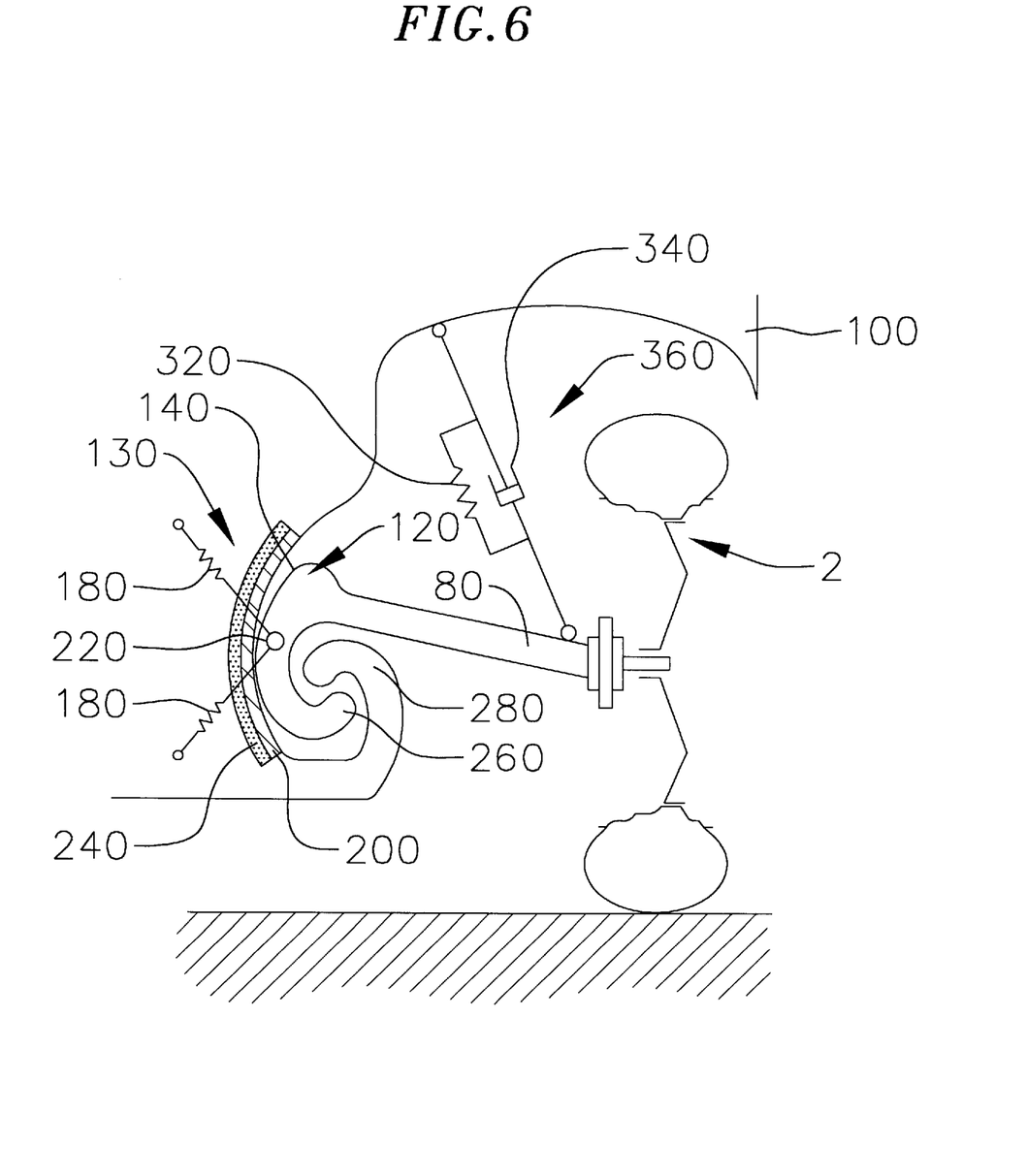
FIG. 6 is a schematic diagram of a suspension system according to a third exemplary embodiment of the present invention.

FIG. 6 shows a suspension system according to a third embodiment of the present invention.

A suspension system according to this embodiment comprises an axle shaft 80 for supporting a wheel 2, and a cam assembly 130 disposed between the axle shaft 80 and a vehicle body 100. The cam assembly comprises a cam 120 integrally formed on an inner end of the axle shaft 80 and having a cam-surface 140, a curvature of which is identical to a trace drawn along instantaneous centers of the wheel 2 when the wheel 2 bumps and rebounds, a cam contacting member 200 contacting the cam 120, and an insulating member 240 disposed between the cam contacting member 200 and the vehicle body 100.

The cam-contacting member 200 has a curvature larger than that of the cam surface 140 of the cam 120. The cam 120 is biased toward the vehicle body by tension springs 180. That is, the tension springs 180 connects the vehicle body 100 to a spring fixing member 220 formed on the cam 120 such that the axle shaft 8 is biased toward the vehicle body 100 in a direction of its longitudinal axis.

The cam 120 is curved toward the wheel 2 so that it is provided with a hook portion 260. The vehicle body 100 is extended toward the wheel 20 at its lower portion below the cam contacting member 200, then curved toward the vehicle body 100 to form a hook portion 280. The hook portion 260 of the cam 260 is hooked to the hook portion 280 of the vehicle body 100 in such a manner that the hook portions 260 and 280 do not interfere with each other when the wheel 20 ascends and descends.

Figure 7:
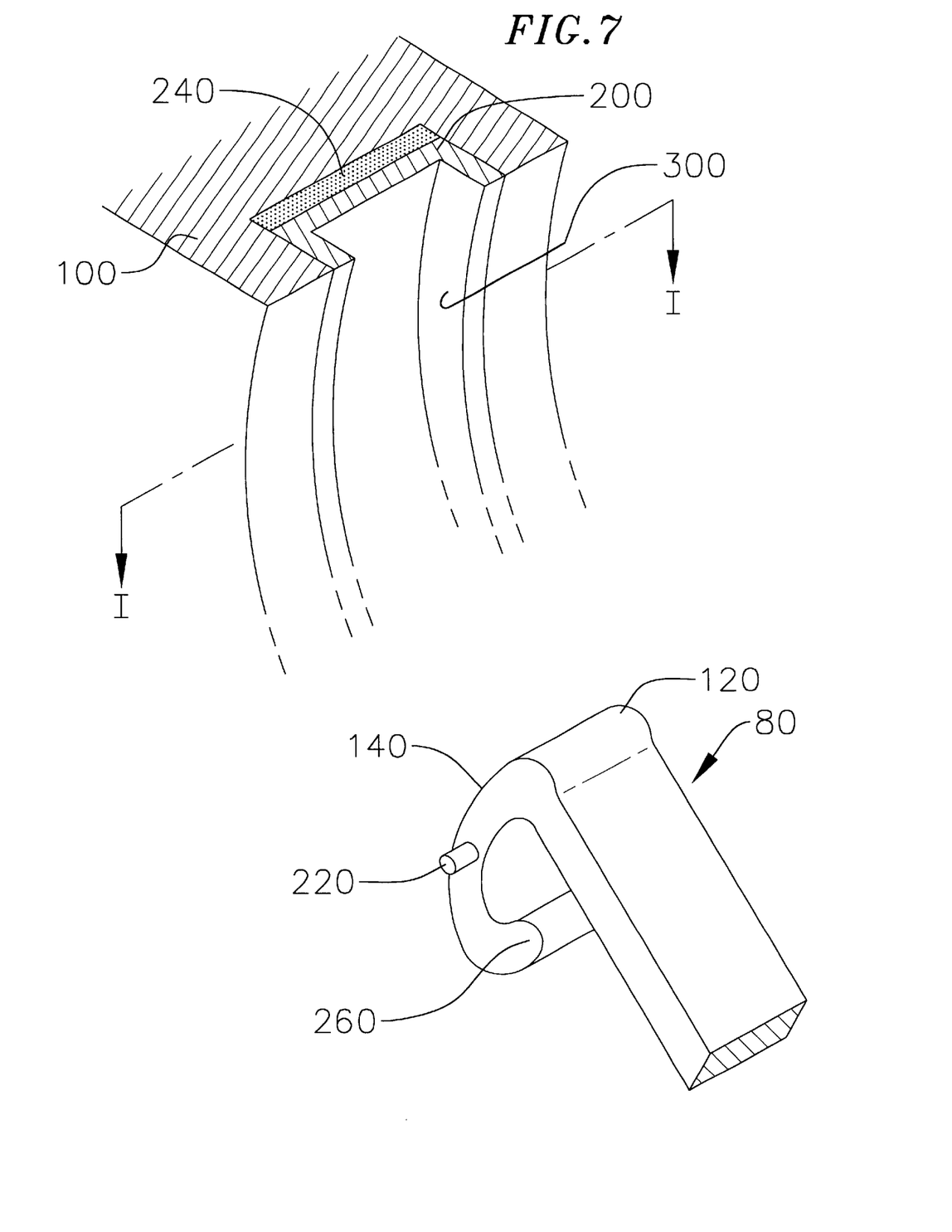
FIG. 7 is an exploded perspective view of a cam assembly depicted in FIG. 6.
Figure 8:
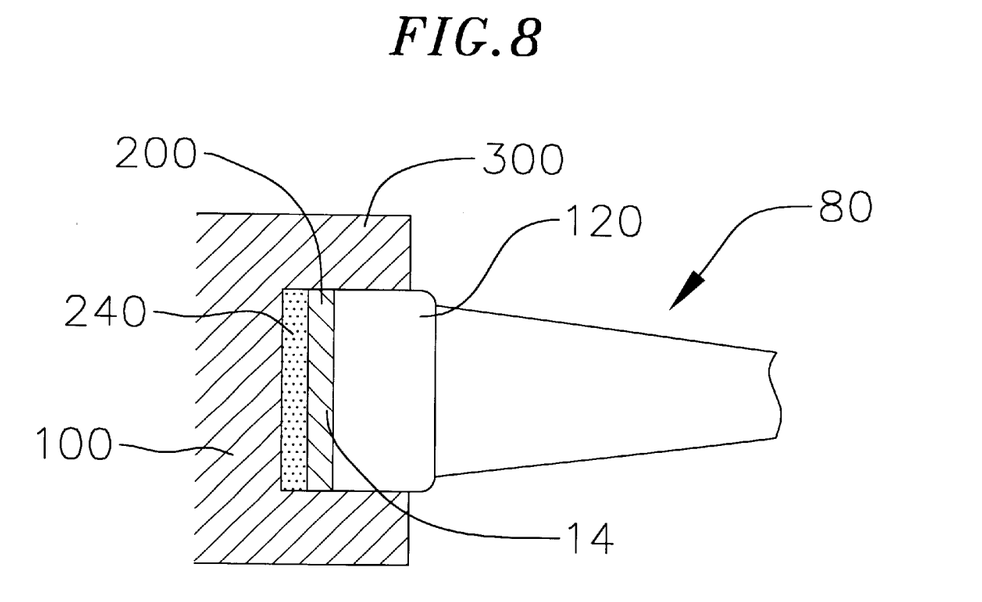
FIG. 8 is an sectional view taken along line I—I of FIG. 7.

FIGS. 7 and 8 show detailed views of the cam assembly 130 depicted in FIG. 6.

The insulating member 240 is embedded into the vehicle body 100, and the cam contacting member 200 is also embedded into the vehicle body 100 in a state contacting the insulating member 240. The cam contacting member 200 is provided with a vertical groove 300 in which the cam 120 is fitted so that the cam 120 does not move in a longitudinal direction of the vehicle body 100. The insulating member 240 prevents impact force from directly transmitting to the vehicle body 100 when wheel 20 ascends and descends.

Referring again to FIG. 6, the axle shaft 80 is vertically supported on the vehicle body 100 by a strut assembly 360 having a spring 320 and a shock absorber 340 to absorb impact force which is vertically transmitted to the vehicle body 100 from the wheel 20.

The operation of the above described suspension system will be described hereinafter with reference to FIG. 9.

Figure 9:
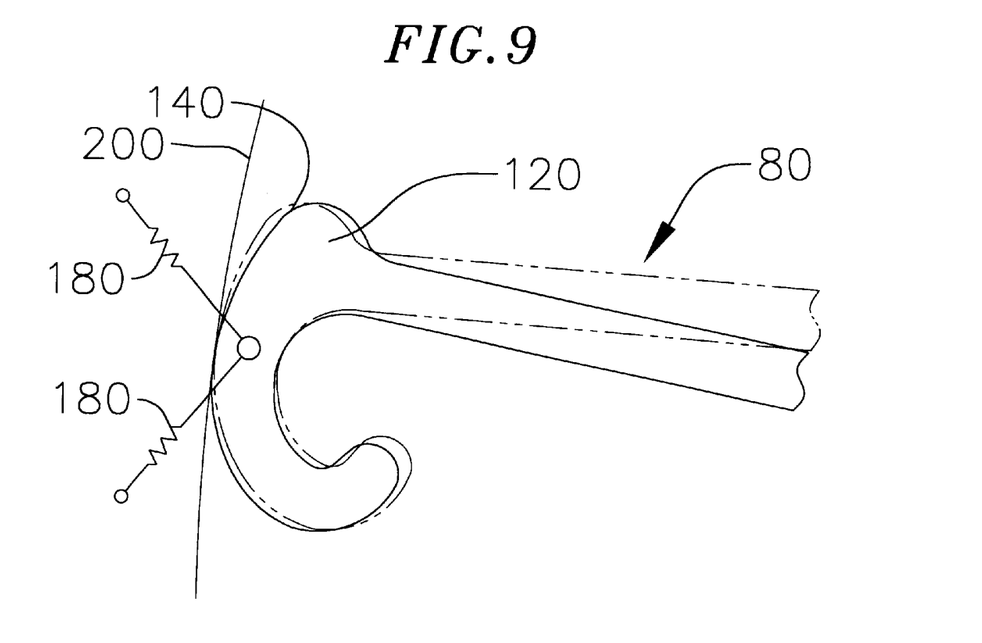
FIG. 9 is a schematic view illustrating the operation of a suspension system depicted in FIG. 6.

When the wheel 20 bounds, the axle shaft 80 rotates counterclockwise as shown in FIG. 9. At this point, a contact point between the cam 120 and the cam contact members 200 moves upward. That is, since the curvature of the cam surface 140 is formed to be identical to the line drawn along instantaneous centers of the wheel 2, the substantial instantaneous centers of the wheel 2 varies along the curvature of the cam contacting member 20.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A suspension system for a vehicle, comprising:
   an axle shaft for rotatably supporting a wheel;
   a strut assembly for vertically supporting the axle shaft on a vehicle body; and
   a cam disposed between a vehicle body and a vehicle body side end of the axle shaft, the cam having a cam surface curved toward the wheel; and
   a cam contacting member disposed between the cam and the vehicle body, the cam contacting member having a cam contacting surface adjacent to the cam surface curved toward the wheel, wherein the wheel bounces along an instantaneous center line having a curvature, wherein the cam surface has a curvature identical to the curvature of the instantanous center line and wherein the cam contacting surface has a curvature which is larger than the curvature of the cam surface.

2. The suspension system of claim 1 further comprising an insulating member disposed between the cam contacting member and the vehicle body.

3. The suspension system of claim 1 wherein the axle shaft is biased toward the vehicle body by a tension spring.

4. The suspension system of claim 1 wherein the cam is integrally formed on a vehicle body side end of the axle shaft.

5. The suspension system of claim 4 further comprising an insulating member disposed between the cam contacting member and the vehicle body.

6. The suspension system of claim 1 wherein the vehicle body comprises a portion defining a hook, wherein the cam defines another hook, wherein at least a portion of the vehicle hook is positioned within the cam hook.

7. A suspension system for a vehicle, comprising:
an axle shaft for rotatably supporting a wheel, wherein the wheel bounces along a curved instantaneous center line having a curvature;
a strut assembly for supporting the axle shaft on a vehicle body;
a bracket for coupling to a vehicle body;
a cam contacting member mounted on the bracket, the cam contacting member having a cam contacting surface having a curvature curving toward the wheel; and
a cam sandwiched between an end of the axle shaft and the cam contacting member, the cam having a cam surface adjacent to the cam contacting surface and having a curvature curving toward the wheel, wherein the curvature of the cam surface is the same as the curvature of the curved instantaneous center line.

8. The suspension system of claim 7 wherein the bracket comprises two opposite walls and wherein the cam contacting member is mounted between the two opposite walls.

9. The suspension system of claim 8 further comprising:
a guide slot formed on each opposite wall, wherein each guide slot has a curvature curving in a direction opposite of the curvature of the cam surface;
a guide slot formed through the cam having a curvature curving in a direction opposite the curvature of the cam surface;
an opening formed on each wall;
a first guide pin penetrating the opening on each wall and the guide slot formed through the cam; and
a second guide pin penetrating the guide slots in the opposite walls and an opening formed through the axle shaft.

10. The suspension system of claim 9 wherein the second guide pin is a fastener.

11. The suspension system of claim 10 further comprising a nut, wherein the second guide pin has a head and a threaded end opposite the head, wherein the nut is threaded on the threaded end sandwiching the two opposite walls between the head and the nut.

12. The suspension system of claim 9 further comprising a spring coupled to the second guide pin and to the vehicle body.

13. The suspension system of claim 12 comprising a second spring coupled to the second guide pin and to the vehicle body, wherein one spring is coupled to one end of the second guide pin and wherein the other spring is coupled to another end of the second guide pin.

14. The suspension system of claim 12 wherein the spring is a tension spring biasing the second guide pin and the axle shaft toward the vehicle body.

15. The suspension system as recited in claim 9 further comprising an insulating member coupled to the cam contacting member opposite the cam contacting member surface adjacent to the cam surface.

16. A suspension system for a vehicle, comprising:
an axle shaft for rotatably supporting a wheel;
a strut assembly for vertically supporting the axle shaft on a vehicle body; and
a cam integrally formed on a vehicle body side end of the axle shaft, the cam having a cam surface curved toward the wheel, wherein the vehicle body comprises a portion defining a hook, wherein the cam defines another hook, wherein at least a portion of the vehicle hook is positioned within the cam hook, wherein the cam can move relative to the vehicle hook when the wheel bounces, wherein the wheel bounces along an instantaneous center line having a curvature, and wherein the cam surface curvature is identical to the curvature of the instantaneous center line.

17. The suspension system as of claim 16 further comprising a spring coupled to the axle shaft and to the vehicle.

18. The suspension system of claim 17 wherein the spring is a tension spring biasing the axle shaft toward the vehicle body.

19. The suspension system of claim 17 wherein the spring is coupled to the cam.

20. The suspension system of claim 16 further comprising a cam contacting member coupled to the vehicle body and disposed between the vehicle body and the cam, wherein the cam contacting member comprises a cam contacting surface having a curvature toward the wheel, and wherein the cam surface curves toward the wheel and is adjacent to the cam contacting surface.

21. The suspension system of claim 20 wherein a groove is formed on the cam contacting member, wherein the cam contacting surface is within the groove and wherein at least a portion of the cam is fitted within the groove.

22. The suspension system of claim 20 further comprising an insulating member disposed between the cam contacting member and the vehicle body.

23. A suspension system for a vehicle, comprising:
an axle shaft for rotatably supporting a wheel, the axle shaft being biased toward the vehicle body by a tension spring;
a strut assembly for vertically supporting the axle shaft on a vehicle body; and
a cam assembly for coupling a vehicle body side end of the axle shaft to the vehicle body, wherein the wheel bounces along an instantaneous center line having a curvature, wherein the vehicle body side end of the axle shaft contacts the vehicle body with a surface having a curvature identical to an instantaneous center line of the wheel.

24. A suspension system for a vehicle, comprising:
an axle shaft for rotatably supporting a wheel;
a strut assembly for vertically supporting the axle shaft on a vehicle body; and
a cam on a vehicle body side end of the axle shaft, the cam having a cam surface curved toward the wheel, wherein the vehicle body comprises a portion defining a hook, wherein the cam defines a hook, wherein at least a portion of the vehicle hook is positioned within the cam hook, wherein the cam can move relative to the vehicle hook when the wheel bounces, wherein the wheel bounces along an instantaneous center line having a curvature, and wherein the cam surface curvature is identical to the curvature of the instantaneous center line of the wheel.

* * * * *